United States Patent
Dave et al.

(10) Patent No.: US 9,709,409 B2
(45) Date of Patent: Jul. 18, 2017

(54) NAVIGATION SYSTEM ACQUISITION AND USE OF CELLULAR COVERAGE MAP DATA

(71) Applicant: APPLE INC., Cupertino, CA (US)

(72) Inventors: Swapnil R. Dave, Santa Clara, CA (US); Devrim Varoglu, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/718,895

(22) Filed: May 21, 2015

(65) Prior Publication Data

US 2016/0076895 A1 Mar. 17, 2016

Related U.S. Application Data (63) Continuation of application No. 13/601,804, filed on Aug. 31, 2012, now Pat. No. 9,043,135.

(51) Int. Cl.
*G01C 21/00* (2006.01)
*G01C 21/34* (2006.01)
(Continued)

(52) U.S. Cl.
CPC ......... *G01C 21/34* (2013.01); *G01C 21/3453* (2013.01); *G01C 21/3461* (2013.01);
(Continued)

(58) Field of Classification Search
CPC ......... H04W 36/0022; H04W 36/0055; H04W 36/02; H04W 36/08; H04W 36/165;
(Continued)

(56) References Cited

U.S. PATENT DOCUMENTS 6,236,933 B1 5/2001 Lang
6,597,906 B1 7/2003 Van Leeuwen et al.
(Continued)

FOREIGN PATENT DOCUMENTS

| DE | 10025725 A1 | 12/2001 |
|----|-------------|---------|
| EP | 1777890 A1 | 4/2007 |
| EP | 2073486 A1 | 6/2009 |

OTHER PUBLICATIONS

Non-Final Office Action for U.S. Appl. No. 13/601,804, mailed Oct. 18, 2013, 18 pages.
(Continued)

*Primary Examiner* — Muhammad Shafi
(74) *Attorney, Agent, or Firm* — Robert C. Kowert; Meyertons, Hood, Kivlin, Kowert & Goetzel, P.C.

(57) ABSTRACT

A mobile device can obtain wireless network signal strength map data that indicates, for various nearby geographical regions, the wireless network signal strength in each such region. A mobile device can transmit that data to a vehicular navigation system responsible for automatically selecting a high-quality route of vehicular travel between a specified source and destination. The system can take the wireless network signal map data into account when selecting that route. When selecting from among multiple different routes of vehicular travel between a specified source and destination, the system may employ an algorithm that considers wireless network signal strengths along those routes, in addition to the other factors. Consequently, the system can select a longer route having better signal strength over a shorter route having worse signal strength. The system can present the selected route within a set of suggested routes, potentially along with reasons for each route's suggestion.

20 Claims, 4 Drawing Sheets

(51) Int. Cl.
*H04W 4/04* (2009.01)
*H04L 1/20* (2006.01)
*H04W 24/08* (2009.01)

(52) U.S. Cl.
CPC ............... *H04L 1/20* (2013.01); *H04W 4/046* (2013.01); *H04W 24/08* (2013.01)

(58) Field of Classification Search
CPC ... H04W 36/20; H04W 36/36; H04W 40/244; H04W 48/14; H04W 48/18; H04W 4/003; H04W 4/008; H04W 4/027; H04W 4/046; H04W 52/226; H04J 11/0053; G08B 13/19684; G08B 25/10; G08B 3/1016; G01C 21/3461; G01C 21/34; G01C 21/3453; H04L 1/20
USPC ....... 701/400–413, 423, 428, 447, 454, 460, 701/526, 541; 340/995.1, 995.11, 995.16, 340/995.18, 995.19, 995.22
See application file for complete search history.

(56) References Cited

U.S. PATENT DOCUMENTS

| | | | |
|---|---|---|---|
| 6,721,572 | B1 | 4/2004 | Smith et al. |
| 7,020,468 | B2 | 3/2006 | Squibbs et al. |
| 7,127,213 | B2 | 10/2006 | Haymes et al. |
| 7,603,115 | B2 | 10/2009 | Banavar et al. |
| 8,589,070 | B2 | 11/2013 | Ban et al. |
| 9,043,135 | B2 | 5/2015 | Dave et al. |
| 9,057,620 | B2 | 6/2015 | Dave et al. |
| 2006/0135180 | A1* | 6/2006 | Jakel ............... H04W 48/16 455/456.5 |
| 2008/0009324 | A1* | 1/2008 | Patel ............... H04W 48/18 455/566 |
| 2009/0017840 | A1 | 1/2009 | Camp, Jr. et al. |
| 2009/0209271 | A1* | 8/2009 | Reed ............... G01S 5/02 455/456.6 |
| 2009/0247137 | A1 | 10/2009 | Awad |
| 2010/0240346 | A1 | 9/2010 | Jain et al. |
| 2010/0250269 | A1* | 9/2010 | Rappaport ........ G06Q 10/067 705/1.1 |
| 2012/0009890 | A1 | 1/2012 | Curcio et al. |
| 2012/0021776 | A1* | 1/2012 | Phillips ............. G06Q 30/0282 455/456.3 |
| 2012/0131212 | A1* | 5/2012 | Tang ................. G01C 21/3423 709/228 |
| 2013/0024107 | A1* | 1/2013 | Xie .................. G01C 21/3461 701/423 |
| 2013/0225204 | A1* | 8/2013 | Mathews .......... H04N 21/4126 455/456.3 |
| 2013/0325326 | A1* | 12/2013 | Blumenberg ........ G01C 21/32 701/428 |
| 2014/0199980 | A1 | 7/2014 | Rao et al. |
| 2014/0200038 | A1 | 7/2014 | Rao et al. |

OTHER PUBLICATIONS

Final Office Action for U.S. Appl. No. 13/601,804, mailed Apr. 21, 2014, 19 pages.
International Search Report and Written Opinion for International PCT Application No. PCT/US2013/078552, mailed Mar. 21, 2014, 11 pages.
International Search Report and Written Opinion for International PCT Application No. PCT/US2014/010672, mailed Mar. 21, 2014, 11 pages.
Notice of Allowance for U.S. Appl. No. 13/601,804, mailed Oct. 16, 2014, 12 pages.
Non-Final Office Action for U.S. Appl. No. 13/743,246, mailed Dec. 18, 2014, 13 pages.
Non-Final Office Action for U.S. Appl. No. 13/743,242, mailed Mar. 10, 2015, 17 pages.
Notice of Allowance for U.S. Appl. No. 13/601,804, mailed Mar. 30, 2015, 13 pages.
Final Office Action for U.S. Appl. No. 13/743,246, mailed May 4, 2015, 21 pages.
Notice of Allowance for U.S. Appl. No. 14/602,873, mailed May 5, 2015, 14 pages.

* cited by examiner

NAVIGATION SYSTEM ACQUISITION AND USE OF CELLULAR COVERAGE MAP DATA

CROSS REFERENCE TO RELATED APPLICATIONS

The present application is a continuation of U.S. application Ser. No. 13/601,804, filed Aug. 31, 2012, which is hereby incorporated by reference for all purposes.

BACKGROUND

The present disclosure relates generally to mobile devices, and in particular to techniques for locating quality mobile communication signals for mobile devices.

Computers and other electronic devices can communicate with each other over networks such as local area networks, wide area networks, and the Internet. Mobile devices such as cell phones, including so-called smart phones, can communicate with each other wirelessly over a variety of wireless networks including 3G and 4G networks. The quality of communications over such wireless networks typically depends strongly on the strength of the wireless network signal. As a mobile device travels farther and farther away from a wireless network signal transmitter/receiver, such as a cell phone tower or WiFi access point, the wireless network signal coming from that transmitter/receiver becomes weaker and weaker. Additionally, if the line of sight between a mobile device and a wireless network signal transmitter/receiver becomes obstructed—such as might occur if the mobile device were to enter a deep valley or pass around a high mountain—then the wireless network signal coming from that transmitter/receiver can be weakened significantly. Some geographical locations may be so remote, undeveloped, and/or obstructed that it may be impossible for a mobile device to receive any wireless network signal at all. Weakened wireless network signals may at first cause the mobile device's audio communications (e.g., cellular telephone calls) to become audibly choppy, and then later may cause the mobile device's audio communications to terminate completely (leading to dropped cellular telephone calls). Weakened wireless network signals also may require data packet communications to be retransmitted, since some data packets may become dropped while the wireless network signal is weak, resulting in reduced data bandwidth and slower data transmission.

The modern world has become an increasingly busy place, often requiring people to find time to communicate during times that those people are traveling. While a person is traveling in an automobile or on a train, that person might be conducting a telephone call or transmitting and receiving packetized data through his mobile device. The information involved in the person's communications might be important and time-sensitive, such that interruption of those communications could cause considerable hardship to the person. Unfortunately, the fairly fast speeds and which automobiles and trains travel, combined with the often limited communication range of wireless network signal transmitters/receivers, sometimes further complicated by highly varied types of geographical terrain in some regions, can unexpectedly lead to a much-weakened wireless network signal right in the middle of the communication session that a traveling person is conducting using his mobile device. When such communication sessions are lengthy in duration, and when the route of travel is long, the opportunities for dropped calls and/or poor packetized data transmissions can become irritatingly frequent. A traveling person needing to conduct an important but lengthy communication session using his mobile device often will have a difficult time planning an opportune time to engage in that session.

SUMMARY

Certain embodiments of the present invention can enable a mobile device, such as a so-called smart phone, to obtain wireless network signal strength map data that indicates, for various nearby geographical regions, the wireless network signal strength in each such region. Having obtained such wireless network signal strength map data, such a mobile device can then transmit that data to a vehicular navigation system—potentially a software application executing on the mobile device itself or a hardware component built-in to a vehicle in which the mobile device's user is traveling. The vehicular navigation system, which is responsible for automatically selecting a high-quality route of vehicular travel between a specified source and destination, can take the wireless network signal map data into account when selecting that route. For example, when selecting from among multiple different routes of vehicular travel between a specified source and destination, the vehicular navigation system may employ an algorithm that gives some weight to wireless network signal strengths along those routes, in addition to the other factors that such a vehicular navigation usually considers (e.g., distance, speed limits, current traffic congestion, etc.). Depending on the importance given to having a strong wireless network signal during a trip, the vehicular navigation system can select a longer, slower route having better total wireless network signal strength over a shorter, faster route having worse total wireless network signal strength. The vehicular navigation system can then suggest the selected route to the system's user or present the selected route to the system's user within a set of multiple different suggested routes, potentially along with reasons for each route's suggestion.

Certain embodiments of the invention can provide the user of a mobile device with information that the user can employ in choosing his own route, or in choosing when and where to begin conducting a wireless communication session (e.g., a cellular telephone call or a packetized data transmission session) using his mobile device. For example, after obtaining wireless network signal strength map data as discussed above, a mobile device can display a graphical map that indicates, for each geographical region nearby to the mobile device's current location, an indication of the current wireless signal strength for that geographical region.

The following detailed description together with the accompanying drawings will provide a better understanding of the nature and advantages of the present invention.

BRIEF DESCRIPTION

DETAILED DESCRIPTION

Figure 1:
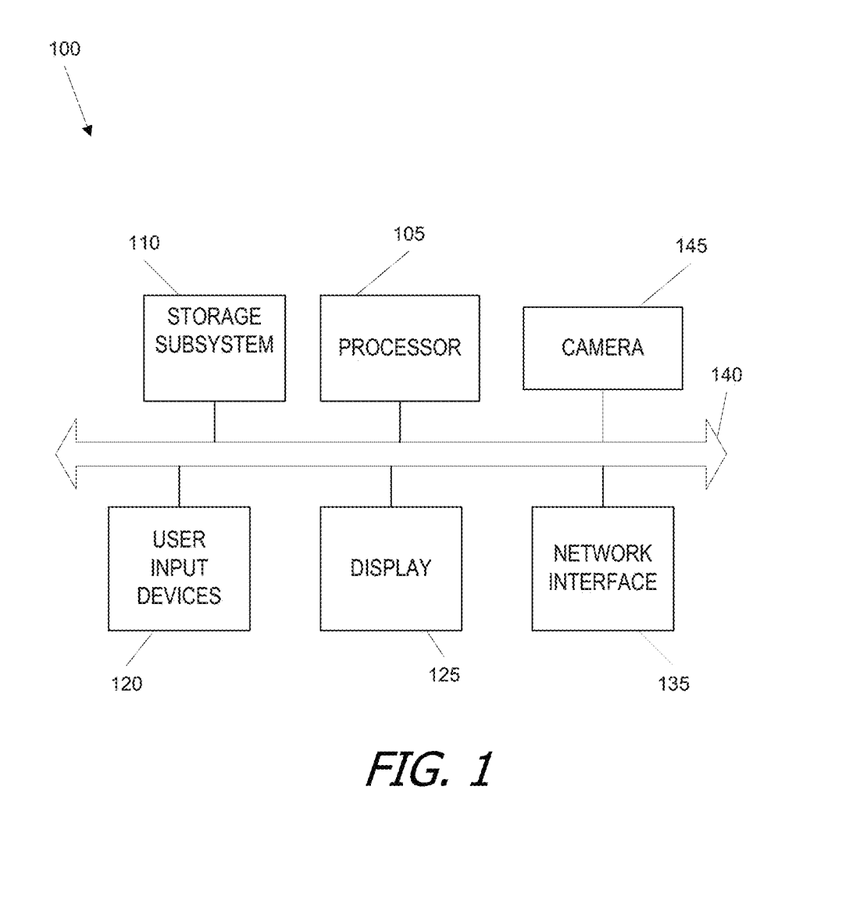
FIG. 1 is a block diagram of a computer system according to an embodiment of the present invention.

FIG. 1 illustrates a computing system 100 according to an embodiment of the present invention. Computing system 100 can be implemented as any of various computing devices, including, e.g., a desktop or laptop computer, tablet computer, smart phone, personal data assistant (PDA), or any other type of computing device, not limited to any particular form factor. Computing system 100 can include processing unit(s) 105, storage subsystem 110, input devices 120, display 125, network interface 135, a camera 145, and bus 140. Computing system 100 can be an iPhone or an iPad.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of computing system 100. The permanent storage device can be a read-and-write memory device. This permanent storage device can be a non-volatile memory unit that stores instructions and data even when computing system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105. "Software" refers generally to sequences of instructions that, when executed by processing unit(s) 105 cause computing system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by computing system 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for computing system 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of computing system 100. For example, bus 140 can communicatively couple processing unit(s) 105 with storage subsystem 110. Bus 140 also connects to input devices 120 and display 125. Bus 140 also couples computing system 100 to a network through network interface 135. In this manner, computing system 100 can be a part of a network of multiple computer systems (e.g., a local area network (LAN), a wide area network (WAN), an Intranet, or a network of networks, such as the Internet. Any or all components of computing system 100 can be used in conjunction with the invention.

A camera 145 also can be coupled to bus 140. Camera 145 can be mounted on a side of computing system 100 that is on the opposite side of the mobile device as display 125. Camera 145 can be mounted on the "back" of such computing system 100. Thus, camera 145 can face in the opposite direction from display 125. Camera 145 can continuously capture video images of the scene that currently is visible behind computing system 100, from the perspective of the user that is looking at display 125.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for computing system 100. For example, processing unit(s) 105 can execute a wireless network signal strength map-gathering application.

It will be appreciated that computing system 100 is illustrative and that variations and modifications are possible. Computing system 100 can have other capabilities not specifically described here (e.g., mobile phone, global positioning system (GPS), power management, one or more cameras, various connection ports for connecting external devices or accessories, etc.). Further, while computing system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 4:
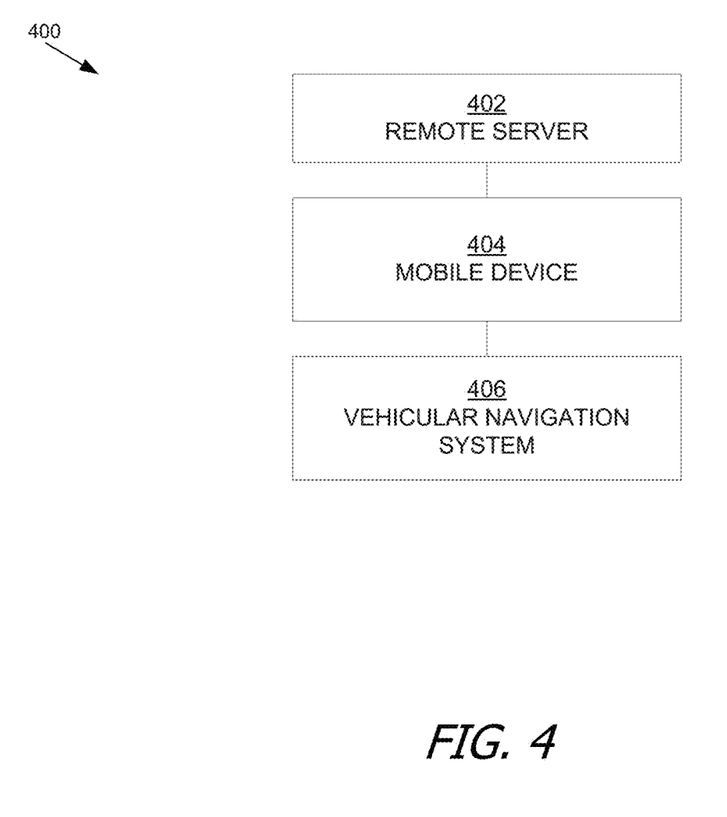
FIG. 4 is a block diagram illustrating an example of a system 400 in which embodiments of the invention can be implemented.

FIG. 4 is a block diagram illustrating an example of a system 400 in which embodiments of the invention can be implemented. System 400 includes a remote server 402 that is communicatively coupled via one or more wireless networks to a mobile device 404 such as a cellular telephone, smart phone, or other kind of mobile device. Mobile device 404 is communicatively coupled, either wirelessly or via a guided medium, to a vehicular navigation system 406. Examples of behaviors of each of these components of system 400 are described in further detail below.

Vehicular Navigation System Using Wireless Network Signal Strength

Figure 2:
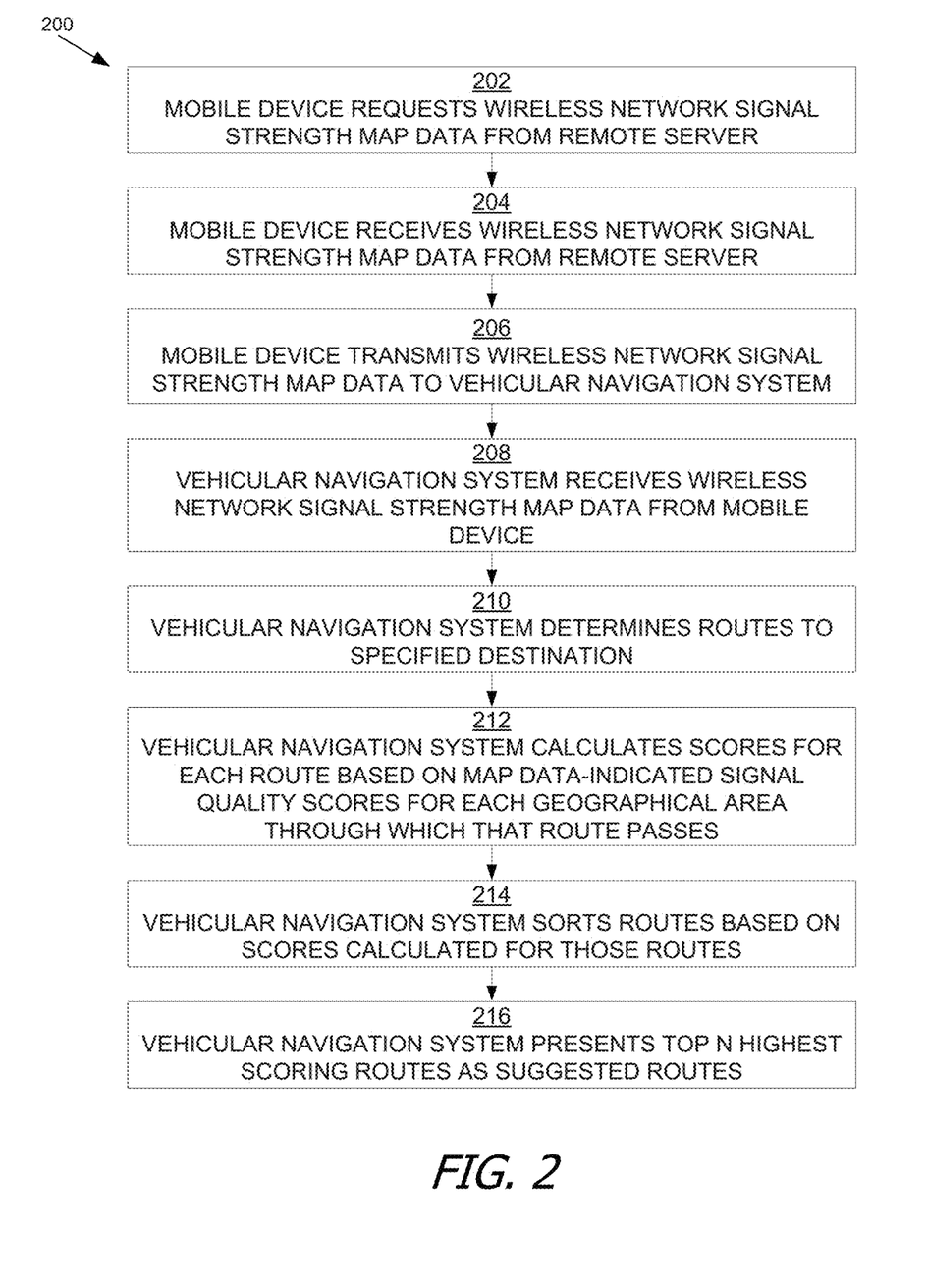
FIG. 2 is a flow diagram illustrating an example of a technique whereby a vehicular navigation system can select a vehicular travel route based at least in part on the wireless network signal strength along that route, according to an embodiment of the invention.

FIG. 2 is a flow diagram illustrating an example of a technique 200 whereby a vehicular navigation system can select a vehicular travel route based at least in part on the wireless network signal strength along that route, according to an embodiment of the invention. In block 202, a mobile device, such as a smart phone, can request wireless network signal strength map data over a wireless network from a remote server. The request can indicate the mobile device's current geographical location. The mobile device can determine its current geographical location using the mobile device's built-in global positioning system (GPS). In block 204, the mobile device can receive the wireless network signal strength map data over the wireless network in response to the mobile device's request. The wireless network signal strength map data can indicate, for multiple geographical regions within a specified distance from the mobile device's current geographical location, a current wireless network signal strength in each such region. In block 206, the mobile device can transmit the wireless network signal strength map data to a vehicular navigation system of an automobile or other vehicle. The mobile device can transmit this map data wirelessly to the vehicular navigation system using Bluetooth communication technology or other wireless network communication technology. Alternatively, the mobile device can transmit the map data over a guided medium, such as a universal serial bus (USB) cable, to a vehicular navigation system to which the mobile device is currently and temporarily tethered via the guided medium.

In block 208, the vehicular navigation system can receive the map data from the mobile device. In block 210, the vehicular navigation system can determine one or more routes along available travel channels (e.g., streets, roads, highways, railways, subways, etc.) from the mobile device's (and, presumably, the vehicle's) current geographical location, or another specified source location, to a specified destination. In block 212, the vehicular navigation system can calculate, for each such route, a score based at least in part on the wireless network signal strengths of the regions through which that route passes. Routes passing through regions having total higher wireless network signal strength can be scored more favorably than routes passing through regions having total lower network signal strength. In determining the score for a particular route, the vehicular navigation system can compute a sub-score for each geographical region through which the particular route passes by multiplying the wireless network signal strength level of that geographical region (from the map data) by the quantity of time that the vehicle is predicted to travel through that geographical region on the particular route (e.g., based on the length of that segment of the particular route and the speed limits along that segment of the particular route). The vehicular navigation system can then calculate the sum of the sub-scores as a part of computing the score for the particular route. In determining the score for a particular route, the vehicular navigation system also can take into account other factors such as the total length of the particular route and the estimated time that the vehicle is predicted to require to traverse the particular route. Each factor, including those based on wireless network signal strength, can be multiplied by a different specified weighting factor. These specified weighting factors can be specified by the user of the mobile device or the user of the vehicular navigation system.

In block 214, the vehicular navigation system sorts the multiple routes for which scores have been calculated based on the calculated scores for those routes. In block 216, the vehicular navigation system presents, to a user of the vehicular navigation system, one or more suggested routes from the specified source (potentially the mobile device's and/or vehicle's current geographical location) to the specified destination. The vehicular navigation system may present, as the suggested routes, the routes having the top N highest scores, where N is some specified quantity. The vehicular navigation system may present the routes on a geographical map shown on a graphical display of the system (e.g., a liquid crystal display (LCD), a light-emitting diode (LED) display, a cathode ray tube (CRT), etc.). The geographical map can depict the available travel channels from the specified source to the specified destination. The geographical map can highlight routes that are among the suggested routes. For each such route, the geographical map can indicate (a) a distance of that route, (b) a required time estimate to travel that route, (c) a wireless network signal strength score for that route, and/or other information pertaining to that route.

In one embodiment of the invention, the geographical map visually distinguishes each geographical region on the map based on that region's wireless network signal strength. For example, a spectrum of colors, ranging from green through yellow to red, can indicate a spectrum of wireless network signal strengths, from strong (green) through medium (yellow) to weak (red). Each geographical region on the map can be painted in a color that is representative of that region's wireless network signal strength. The color for a region can be constant throughout the region or may be a gradient reflecting the weakening of a wireless network signal as the distance increases from that signal's point of origin within the region. Wireless network signal transmitters/receivers, such as cell phone towers and WiFi access points, also can be indicated symbolically on the map. In one embodiment of the invention, instead of complete geographical regions on the map, only route segments of the suggested routes are colorized based on the foregoing scheme, so that the viewer of the map gains a clear understanding of how strong a wireless network signal is for each segment of each suggested route.

According to one embodiment of the invention, the technique described above is repeated periodically or constantly during the duration of a trip. For example, as the vehicle travels, the mobile device can request and receive fresh wireless network signal strength map data from the server repeatedly over time. As circumstances change (e.g., due to wireless network congestion, hardware failures, weather interference, or other factors), the most current wireless signal strength map data can vary from previously received wireless signal strength map data. The mobile device can transmit each refreshed instance of the wireless signal strength map data to the vehicular navigation system. In response to receiving revised wireless signal strength map data, the vehicular navigation system can re-compute scores for available routes from the mobile device's or vehicle's current geographical location to the specified destination. The re-computed scores can lead the vehicular navigation system to suggest different routes than those that the vehicular navigation system previously suggested. In one embodiment of the invention, if the vehicular navigation system determines that a particular route other than the current route on which the vehicle is currently traveling has a higher score than the current route, then the vehicular navigation system can audibly and/or visually alert the user of the vehicular navigation system that a more preferable route than the currently traveled route may be available.

Collecting Wireless Network Signal Strength Map Data

In an embodiment of the invention discussed above, a mobile device can request wireless network signal strength map data over a wireless network from a remote server at which such map data is stored. There are various ways in which such map data can be generated for storage at the remote server. Indeed, in one embodiment of the invention, a mobile device does not need to contact the remote server at all, but instead can collect and use wireless network signal strength map data that it has collected and stored based on its own historical experiences alone. In an alternative embodiment of the invention, many separate mobile devices can cooperatively collect such data based on their own historical experiences and wirelessly upload that data to the remote server, where the data from all of the mobile devices can be aggregated in order to obtain potentially more accurate, more complete, and more current map data that then can be distributed wirelessly back to requesting mobile devices.

Figure 3:
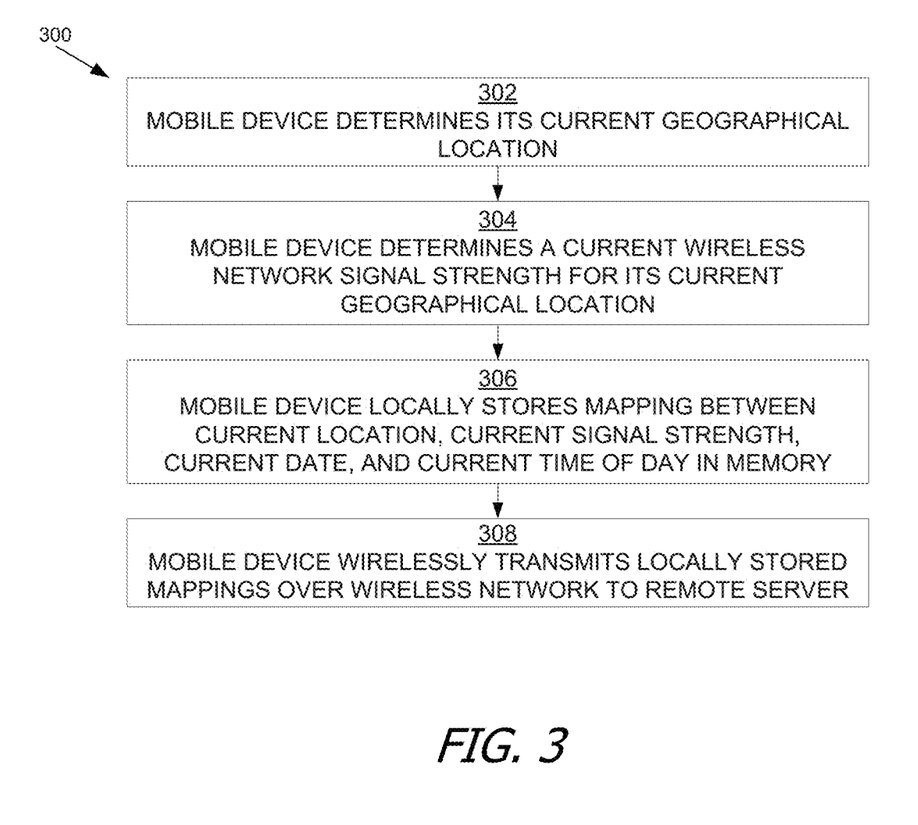
FIG. 3 is a flow diagram illustrating an example of a technique 300 whereby a mobile device collects wireless network signal strength data for transmission to server, according to an embodiment of the invention.

FIG. 3 is a flow diagram illustrating an example of a technique 300 whereby a mobile device collects wireless network signal strength data for transmission to server, according to an embodiment of the invention. In block 302, the mobile device can determine its current geographical location. The mobile device can determine its current geographical location using a built-in GPS of the mobile device. In block 304, the mobile device can determine a current wireless network signal strength for its current geographical location. There are various ways in which such a signal strength can be determined. For example, the mobile device can determine the signal strength based at least in part on a value that is used to compute the number of signal strength bars that smart phones typically present on their displays. For another example, the mobile device can determine the signal strength based at least in part on whether a previously ongoing call has now been dropped, indicating that the signal strength at the current geographical location is poor. For another example, the mobile device can determine the signal strength based at least in part on a quantity of dropped or re-requested data packets during a packetized data communication session. For another example, the mobile device can determine the signal strength based at least in part on an estimated bandwidth or data transmission rate during a packetized data communication session. In block 306, the mobile device can store, in its local memory, a mapping between the current geographical location, the current wireless network signal strength rating (e.g., a quantitative or qualitative value), the current date, and the current time of day.

In block 308, the mobile device can wirelessly transmit the mappings stored in its local memory over a wireless network to a remote server. The mobile device can transmit these mappings periodically, or in response to an instruction by the mobile device's user, or in response to some other specified event. Once received at the remote server, the server can store these mappings in a database maintained by the server. The remote server can populate this database continuously with mappings of this kind received from multiple separate mobile devices at various different times. The remote server can aggregate this data in order to calculate, for each particular geographical location for which one or more mappings have been received, an estimated current wireless network signal strength for that particular geographical location. In performing this aggregation, the remote server can give greater weight to mappings bearing more recent timestamps than it gives to mappings bearing less recent timestamps. The remote server can distill and segregate the aggregated data in various ways. For example, for a particular geographical location, the server can calculate average signal strengths for a particular time of day on a particular day of the week, such that each time of day for each particular day of the week can have a separate aggregated wireless network signal strength rating for the same particular geographical location.

In response to requests for wireless network signal strength map data received from mobile devices, the remote server can provide all or a relevant portion or "slice" of the aggregated map data. The remote server can "slice" the aggregated map data for service to the requesting mobile device in various different ways. For example, the remote server can provide aggregated map data that pertains only to the geographical regions that are within a specified distance away from the requesting mobile device's current geographical location. For another example, the remote server can provide aggregated map data that pertains only to the current time of day and/or day of the week. For another example, the remote server can provide aggregated map data that pertains only to the current calendar date. As is discussed above, in response to receiving such wireless network signal strength map data, a vehicular navigation system in communication with a mobile device that requested the map data can calculate scores for different routes from a specified source to a specified destination.

As is described above, in one embodiment of the invention, a mobile device requests wireless network signal strength map data wirelessly from a remote server. However, in an alternative embodiment, the mobile device can supply, to the vehicular navigation system, the mapping data that it has collected individually, lacking mapping data from any other mobile device, and stored in its local memory over time. This technique can be especially beneficial during moments that wireless communication with the remote server is unavailable to the mobile device. For example, if the mobile device has traveled along a particular route a dozen times, then the mobile device can have accumulated wireless network signal strength data for each geographical point along that route a dozen times. If the mobile device has traveled several different routes, then the mobile device can have accumulated wireless network signal strength data for each geographical point along each of those different routes. For each geographical point along each route that the mobile device has previously traveled, the mobile device can aggregate the wireless network signal strength data mapped to that geographical point in the mobile device's memory in order to produce a locally generated wireless network signal strength map. The mobile device can transmit this locally generated map data to the vehicular navigation system for its use in lieu of map data downloaded from the remote server. As in other embodiments, the mobile device can provide greater weight to more recent signal strength measurements than it provides to less recent signal strength measurements.

In certain embodiment of the invention discussed above, wireless network signal strength map data can be generated based on quality measurements actually obtained in the experiences of one or more mobile devices over time. However, in alternative embodiments of the invention, such wireless network signal strength map data can be generated based additionally or alternatively upon other data sources.

For example, various cell phone companies can already have data pertaining to the wireless network signal strengths within different areas of their own networks. In one embodiment of the invention, the server described above can request and obtains such signal strength data from each cell phone company that is willing to provide that data to the server. The server can request and obtain refreshed data from the cell phone companies periodically or continuously. The server can aggregate and segregate the wireless signal strength data based on the wireless network of the cell phone company from which that data was received. For example, the server can aggregate all signal strength data from one cell phone company separately from all signal strength data from another cell phone company. In one embodiment of the invention, a mobile device's request for wireless network signal strength map data also can identify the particular cell phone company that provides the wireless network that the mobile device exclusively uses. In response to such a request, the server can return, to the mobile device, wireless network map data that pertains only to the particular cell phone company's wireless networks, excluding data that pertains to wireless networks of other cell phone companies.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   measuring, by a mobile device comprising one or more hardware processors and a signal transmitter/receiver, signal strength data for a plurality of areas within a region;
   generating, at the mobile device, a signal strength map for the plurality of areas based at least in part on the signal strength data for the plurality of areas;
   determining, at the mobile device, for the plurality of areas, a quality of communication that is possible within each area of the plurality of areas based at least in part on the signal strength map generated by the mobile device for the plurality of areas;

based at least in part on the quality of communication that is possible within each area of the plurality of areas, selecting, by the mobile device, a particular route from a plurality of routes, each route ending at a same destination; and providing the particular route to a display.

2. The method of claim 1, wherein providing the particular route to the display comprises sending data indicating the particular route to a vehicle navigation system of a vehicle, wherein the vehicle navigation system comprises the display.

3. The method of claim 1, further comprising measuring, at the mobile device at a particular time, a particular network signal strength at a particular area of the plurality of areas.

4. The method of claim 3, further comprising storing, to the mobile device, the signal strength map, wherein the signal strength map comprises mapping data between the particular area, the particular network signal strength and the particular time, and wherein the signal strength data includes the particular network signal strength at the particular time.

5. The method of claim 1, further comprising sending the signal strength data to a remote server configured to aggregate the signal strength data with other collected signal strength data.

6. The method of claim 1, wherein the signal strength data is measured by the mobile device prior to determining the quality of communication.

7. The method of claim 1, wherein determining the quality of communication that is possible with said each area of the plurality of areas is based at least in part on multiple measurements of network signal strength at multiple times.

8. The method of claim 1, further comprising:
requesting updated signal strength data from a remote server;
receiving, at the mobile device via the signal transmitter/receiver, the updated signal strength data; and
transmitting, from the mobile device via the signal transmitter/receiver, the updated signal strength data to a navigation system.

9. A method, comprising:
measuring, by a mobile device comprising one or more hardware processors and a signal transceiver, signal strength data for a plurality of areas within a region;
generating, at the mobile device, a signal strength map for the plurality of areas based at least in part on the signal strength data for the plurality of areas;
determining, by the mobile device, for a particular area of the plurality of areas within the region, a quality of communication that is possible within the particular area based at least in part on the signal strength map generated by the mobile device;
determining, by the mobile device, for a particular road segment of a plurality of road segments within the region, and based at least in part on the quality of communication determined for the particular area in which the particular road segment at least partially occurs, a quality of communication that is possible on the particular road segment;
presenting, on a display, a map indicating the quality of communication that is possible for the particular road segment.

10. The method of claim 9, further comprising determining a color for the particular road segment on the map indicating the quality of communication that is possible for the particular road segment.

11. The method of claim 9, further comprising:
determining a current location of the mobile device by a global positioning system, wherein the mobile device comprises the global positioning system;
measuring a current signal quality at the current location.

12. The method of claim 11, further comprising transmitting, from the mobile device to a remote server, data that maps the current signal quality to the current location.

13. The method of claim 12, wherein the data further maps the current signal quality to a current time at which the current signal quality was measured.

14. The method of claim 9, wherein the map includes a gradient reflecting a weakening of a network signal as a distance increases from a point of origin of the network signal within a region of the map.

15. The method of claim 9, wherein determining the quality of communication that is possible within the particular area is further based on requesting, from a remote server, network signal strength map data that the remote server has collected from a plurality of separate devices.

16. A non-transitory computer-readable storage medium that stores instructions which, when executed by one or more processors, cause the one or more processors to perform:
measuring signal strength data for a plurality of areas within a region;
generating a signal strength map for the plurality of areas based at least in part on the signal strength data for the plurality of areas;
determining, for the plurality of areas within the region, a quality of communication that is possible within that each area of the plurality of areas based at least in part on the generated signal strength map for the plurality of areas;
based at least in part on the quality of communication that is possible within each area of the plurality of areas, selecting a particular route from a plurality of routes, each route ending at a same destination; and
providing the particular route to a display.

17. The non-transitory computer-readable storage medium of claim 16, wherein the instructions further cause the one or more processors to perform:
determining a score for each particular route of the plurality of routes based at least in part on the quality of communication that is possible within each particular area of the plurality of areas; and
sorting the plurality of routes based on each score for each particular route.

18. The non-transitory computer-readable storage medium of claim 16, wherein the instructions further cause the one or more processors to perform:
requesting signal strength map data from a remote server, wherein the signal strength map data indicates a current signal strength for each area of the plurality of areas; and
sending the signal strength map data to a vehicle navigation system, wherein the vehicle navigation system comprises the display.

19. The non-transitory computer-readable storage medium of claim 16, wherein providing the particular route to the vehicle navigation system comprises sending map data to the vehicle navigation system, wherein the map data is generated based at least in part on the signal strength map.

20. The non-transitory computer-readable storage medium of claim 19, wherein the instructions further cause the one or more processors to perform generating the map data based on generated signal strength map.

\* \* \* \* \*